(12) United States Patent
McGowan

(10) Patent No.: US 6,524,237 B1
(45) Date of Patent: *Feb. 25, 2003

(54) METHOD AND APPARATUS FOR USING NON-COHERENT OPTICAL BUNDLES FOR IMAGE TRANSMISSION

(75) Inventor: Steven B. McGowan, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/333,773

(22) Filed: Jun. 15, 1999

(51) Int. Cl.[7] .......................... A61B 1/07; G02B 23/26; H04N 7/18
(52) U.S. Cl. ....................... 600/182; 385/116
(58) Field of Search ................. 600/109, 160, 600/182; 385/116, 117

(56) References Cited

U.S. PATENT DOCUMENTS

| 4,185,888 A | 1/1980 | Quelle, Jr. | |
| 4,674,834 A | * 6/1987 | Margolin | 250/227.2 |
| 4,762,391 A | * 8/1988 | Margolin | 385/116 |
| 5,327,514 A | * 7/1994 | Dujon et al. | 385/116 |
| 5,715,345 A | 2/1998 | McKinley | |
| 6,190,308 B1 | * 2/2001 | Irion et al. | 600/109 |

FOREIGN PATENT DOCUMENTS

| DE | 3239012 C1 | 5/1984 | |
| DE | 09801696 A1 | 8/1999 | |
| EP | 0656723 A1 | 6/1995 | |
| GB | 2082012 | * 2/1982 | 385/116 |
| WO | WO 97/07627 | 2/1997 | |
| WO | WO 00/21279 | 4/2000 | |
| WO | PCT/US00/16552 | 1/2002 | |

* cited by examiner

Primary Examiner—John Mulcahy
(74) Attorney, Agent, or Firm—Steven P. Skabrat

(57) ABSTRACT

Using a non-coherent optical bundle having a plurality of fibers for image transmission. The fibers of the non-coherent optical bundle may be calibrated to generate a mapping function. Image data at a sending end of the non-coherent optical bundle may be obtained and transmitted over the non-coherent optical bundle, the image data being scrambled during transmission to produce scrambled image data at a receiving end of the non-coherent optical bundle. The mapping function may be applied to the scrambled image data to reproduce the image data for use in an imaging system.

28 Claims, 6 Drawing Sheets

SENDING END OF COHERENT OPTICAL BUNDLE

|  | COL 1 | COL 2 | COL 3 |
|---|---|---|---|
| ROW 1 | 0 | 1 | 2 |
| ROW 2 | 3 | 4 | 5 |
| ROW 3 | 6 | 7 | 8 |

RECEIVING END OF COHERENT OPTICAL BUNDLE

|  | COL 1 | COL 2 | COL 3 |
|---|---|---|---|
| ROW 1 | 0 | 1 | 2 |
| ROW 2 | 3 | 4 | 5 |
| ROW 3 | 6 | 7 | 8 |

Figure 1

(Prior Art)

SENDING END OF NON-COHERENT OPTICAL BUNDLE

|  | COL 1 | COL 2 | COL 3 |
|---|---|---|---|
| ROW 1 | 0 | 1 | 2 |
| ROW 2 | 3 | 4 | 5 |
| ROW 3 | 6 | 7 | 8 |

RECEIVING END OF NON-COHERENT OPTICAL BUNDLE

|  | COL 1 | COL 2 | COL 3 |
|---|---|---|---|
| ROW 1 | 8 | 4 | 5 |
| ROW 2 | 2 | 1 | 0 |
| ROW 3 | 3 | 7 | 6 |

Figure 2

METHOD AND APPARATUS FOR USING NON-COHERENT OPTICAL BUNDLES FOR IMAGE TRANSMISSION

BACKGROUND

1. Field

The present invention relates generally to image transmission systems and, more specifically, to analyzing non-coherent optical bundles for use in image transmission systems.

2. Description

Flexible borescopes, endoscopes, and other optical inspection devices typically use coherent optical bundles to transmit images from one location to another. A coherent optical bundle is a collection of glass fibers wherein the relative position of the fibers within the bundle at each end of the bundle is identical. The glass fibers are used to transmit light from one end to the other end. A coherent optical bundle is often the most expensive part of an optical inspection device. It may contain more than 100,000 individual glass fibers, perfectly arranged in the same matrix position from end to end of a long fiber bundle. In some cases, the length of the bundle is four to five meters. In a coherent optical bundle, it is important that the relative position of the fibers at each end of the bundle be identical in order to transmit an image from one end to the other without scrambling it. In essence, each fiber of the bundle is similar to a pixel in a digital image.

FIG. 1 is a schematic example of a known, very small coherent optical bundle. It includes only a few fibers in order to simplify the example. The fibers of the bundle may be arranged in a matrix represented as rows and columns. In this example, there are three rows and three columns in the matrix. Each digit shown in FIG. 1 represents one glass fiber in the bundle. The fibers (e.g., the digits) are shown in this simple example to represent a rectangular object that may be viewed by a borescope or other optical inspection device. Each fiber transmits a portion of the image representing the object being viewed. If the entire image is to be transmitted correctly along the optical bundle from a sending end to a receiving end, each fiber (e.g., a digit) should be configured in a known relationship in the matrix on both ends of the long optical bundle. Otherwise, the image will be garbled or scrambled when it is received at the receiving end.

Coherent optical bundles work reasonably well in a variety of image transmission devices. However, they are typically quite expensive due to the coherency requirement. In contrast, non-coherent optical bundles are much cheaper. A non-coherent optical bundle is a collection of glass fibers where the position of any fiber at one end of the bundle is not necessarily the same as the position of the fiber at the other end. In fact, the positioning of the fibers within the bundle is typically somewhat random. This does not result in a problem when the bundle is used merely to transmit light from one end to the other for illumination purposes. However, if the non-coherent optical bundle is used for image transmission, the images end up being scrambled at the receiving end, and therefore the transmitted images are of minimal utility. Thus, there is a need in the art to overcome these and other problems by a method of using non-coherent optical bundles for image transmission, in order to reduce the cost of optical inspection devices, for example.

SUMMARY

An embodiment of the present invention is a method of using a non-coherent optical bundle having a plurality of fibers for image transmission. The method includes analyzing a configuration of the fibers of the non-coherent optical bundle to generate a mapping function, obtaining image data at a sending end of the non-coherent optical bundle, transmitting the image data over the non-coherent optical bundle, the image data being scrambled during transmission to produce scrambled image data at a receiving end of the non-coherent optical bundle, and applying the mapping function to the scrambled image data to reproduce the image data.

BRIEF DESCRIPTION OF THE DRAWINGS

The features and advantages of the present invention will become apparent from the following detailed description of the present invention in which:

FIG. 1 is a simplified schematic diagram of a coherent optical bundle (prior art);

FIG. 2 is a simplified schematic diagram of a non-coherent optical bundle as used in an embodiment of the present invention;

DETAILED DESCRIPTION

An embodiment of the present invention comprises a method and apparatus for analyzing and using a non-coherent optical bundle to simulate a coherent optical bundle so that the non-coherent optical bundle may be used for image transmission.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

FIG. 2 is a simplified schematic diagram of a non-coherent optical bundle as used in an embodiment of the present invention. As in FIG. 1, the optical bundle of FIG. 2 includes only a few fibers in order to simplify the example. The fibers of the bundle may be arranged in a matrix represented as rows and columns. In this example, there are three rows and three columns in the matrix. Each digit shown in FIG. 2 represents one glass fiber in the bundle. Each glass fiber transmits light from one end of the bundle to the other with minimal loss in intensity or color. The fibers (e.g., the digits) are shown in this simple example to represent a rectangular object that may be viewed by a borescope or other optical inspection device. Each fiber transmits a portion of the image representing the object being viewed. Thus, each fiber may be thought of as transmitting a pixel of an image. In contrast to the example of the coherent optical bundle shown in FIG. 1, the glass fibers of the non-coherent bundle shown in FIG. 2 are not in the same relative position at the receiving end.

In embodiments of the present invention, the scrambled image data obtained at the receiving end of the non-coherent optical bundle may be processed to effectively reorganize the image data transmitted by the glass fibers to simulate a coherent light bundle. Generally, a reference image or set of reference images may be used to establish individual fiber mapping from the sending end to the receiving end. This mapping is static for each optical bundle so the calibration analysis process only needs to be performed once. The calibration analysis may take place during the system manufacturing process or during system initialization at a user's site. Using the mapping information derived from the calibration process, a computer system such as a personal computer (PC), for example, or other processing element at the receiving end of the optical bundle can re-arrange the image data transmitted by the glass fibers so that the original image sensed at the sending end of the non-coherent optical bundle may be reconstructed at the receiving end. This image processing may be performed statically on a single image at a time or may be used for continual real-time imaging.

Figure 3:
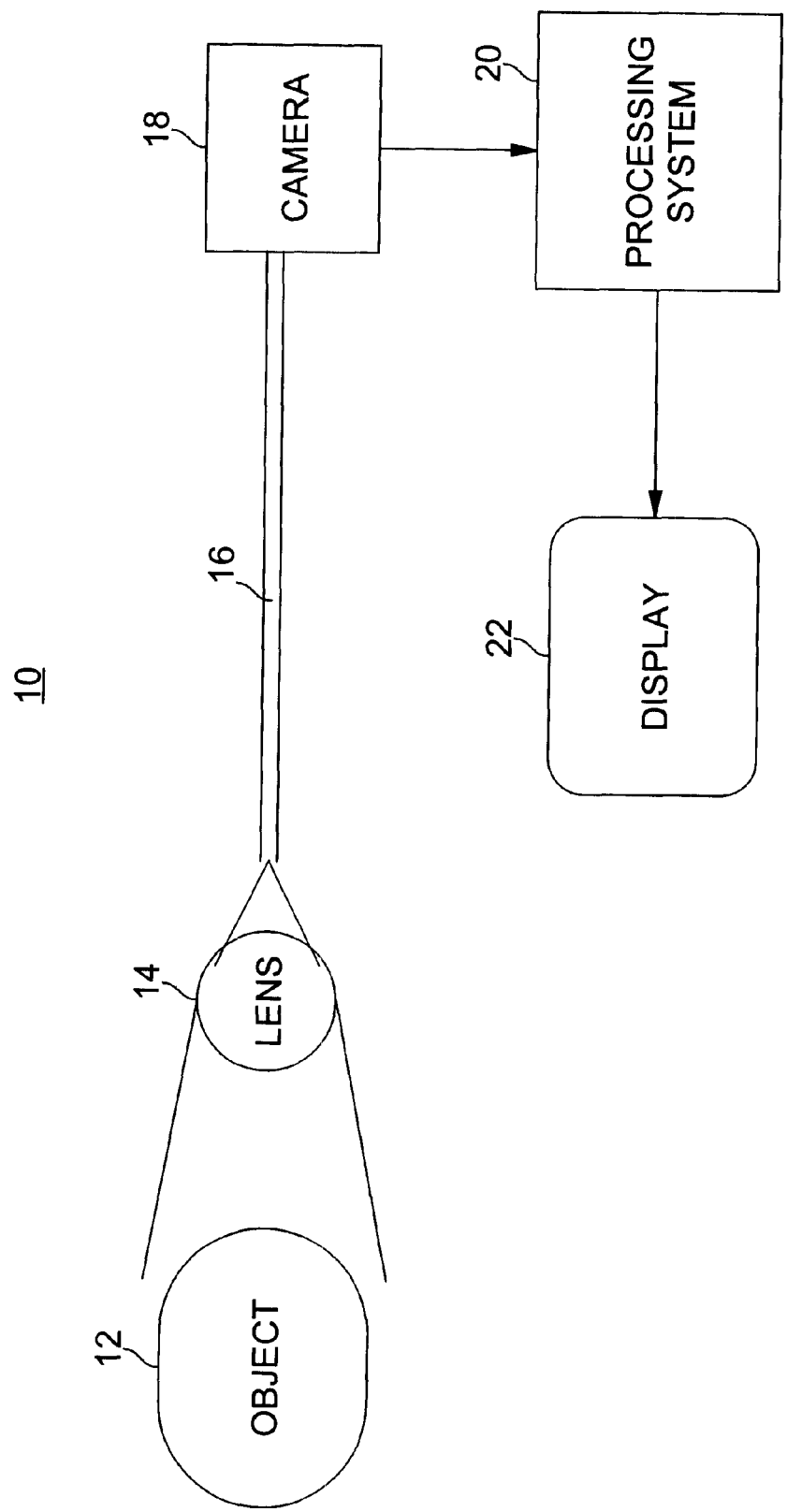
FIG. 3 is a diagram of an image transmission system according to an embodiment of the present invention.

FIG. 3 is a diagram of an image transmission system 10 according to an embodiment of the present invention. An image of an object 12 may be sensed by lens 14. The image data may be transmitted over non-coherent optical bundle 16 to camera 18 or other image handling device (not shown). The image data received by the camera is scrambled due to the non-coherent nature of the non-optical bundle. Camera 16 may forward the scrambled image data to processing system 20. Processing system 20 may be any circuitry capable of performing the calibration and image processing techniques described herein. In one embodiment, it may be a PC, although other general purpose computer systems, special purpose processing systems, and specialized hardware may also be used. The processing system performs image processing methods described below to rearrange the scrambled image data to provide corrected image data. The corrected image data may then be displayed on a display 22.

Figure 4:
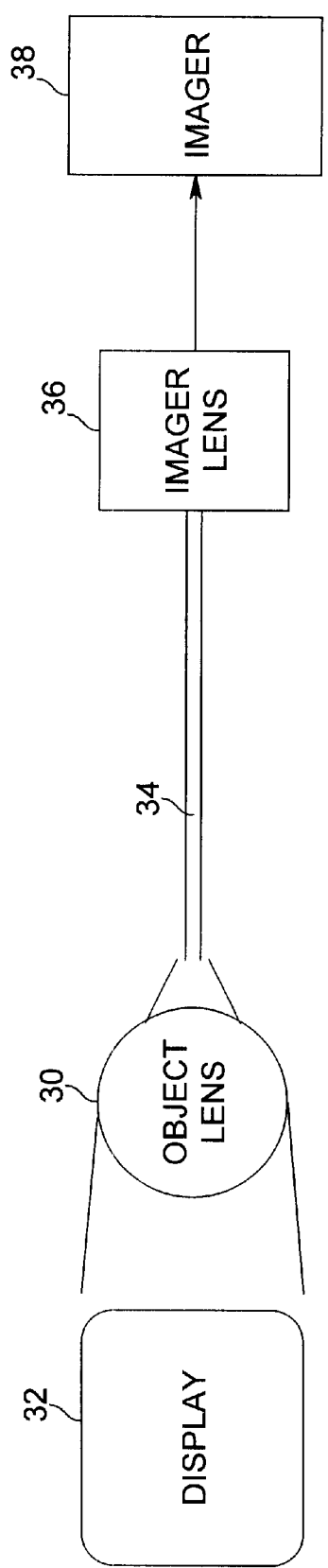
FIG. 4 is a diagram of a system for analyzing a configuration of a non-coherent optical bundle according to an embodiment of the present invention.

Before scrambled image data may be translated into corrected image data, the non-coherent optical bundle used in the image transmission system must be calibrated. FIG. 4 is a diagram of a system for analyzing a configuration of a non-coherent optical bundle according to an embodiment of the present invention. Object lens 30 may be focused on a pixel-based raster display 32. Display 32 may be a cathode ray tube (CRT) computer monitor for example, although other displays such as televisions or liquid crystal displays (LCDs) may also be used. The object lens may be coupled to a sending end of a non-coherent optical bundle 34. The light sensed by the object lens from one or more pixels of the display may be transmitted along the glass fibers of the non-coherent optical bundle from the sending end to the receiving end. This light may be applied through imager lens 36 to focus on imager 38. Imager 38 may be a charge coupled device (CCD) image array or analog image sensor. In one embodiment, imager lens 36 and imager may be included in a camera. In another embodiment, a solid state imager may be bonded directly to the end of the non-coherent optical bundle, thereby eliminating the imager lens from the system.

Both display 32 and imager 38 are addressable as an array of pixels. To "calibrate" the non-coherent optical bundle, a test program being executed by a processor (not shown in FIG. 4) may be used to selectively illuminate at least one pixel on the display at a predetermined intensity level and position. The resulting image transmitted along the non-coherent optical bundle may be sensed by the imager. The position and intensity of the light received by the imager may be recorded in a storage device such as a random access memory (RAM), in a file on a hard disk, or on other non-volatile storage (not shown in FIG. 4). Next, the process may be repeated for a different set of one or more pixels until all pixels of the display have been illuminated and processed. By obtaining information about which glass fibers are transmitting light from a selected set of one or more pixels of the display on the sending end to the imager at the receiving end over the set of tests, a mapping function may be created by the processor to translate scrambled image data from the glass fibers into corrected image data. Thus, the complete color and intensity of all pixels on the display can be reconstructed back to their proper locations in an image array at the receiving end. Once the mapping function has been determined, the non-coherent optical bundle may be used for imaging in an image transmission system because the computer system may translate the scrambled image data into corrected image data according to the mapping function.

Figure 5:
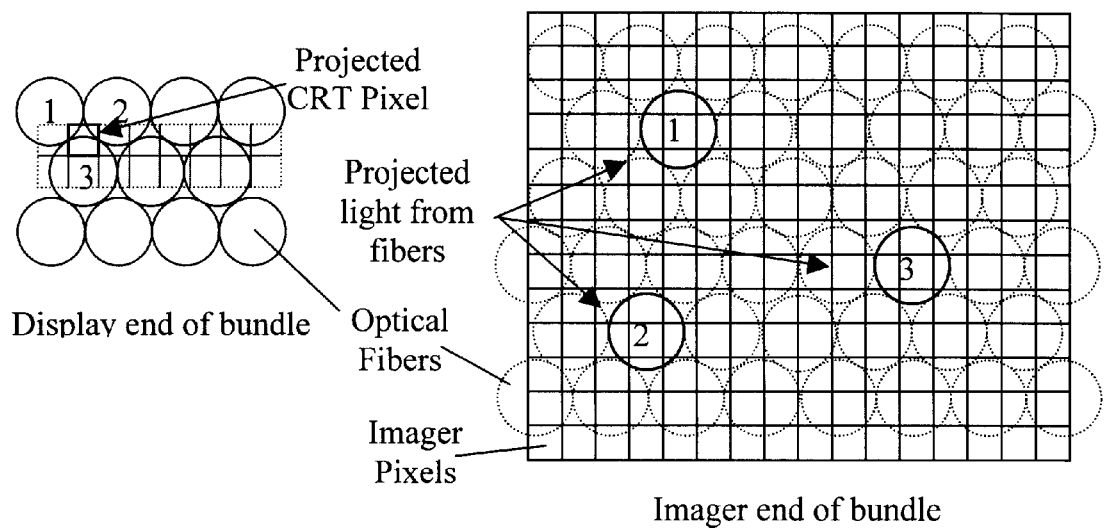
FIG. 5 is a diagram of an example of glass fibers of a non-coherent optical bundle being analyzed according to an embodiment of the present invention.

FIG. 5 is a diagram of an example of glass fibers of a non-coherent optical bundle being analyzed according to an embodiment of the present invention. A selected pixel may be illuminated on the display. This pixel is represented as a square box for the display end of the bundle in FIG. 5. Only a portion of the display end of the bundle is shown in this example. Note that in this example, the pixel is smaller than a single fiber and the light from the pixel may be transmitted along three fibers. Fiber number 3 receives about 50% of the pixel illumination, and fibers 1 and 2 each receive about 15% of the pixel's illumination. In other embodiments and examples, the pixels may be equal to or larger than a fiber, the fibers may not be round, and the pixel's illumination may be transmitted by one or more fibers, and the invention is not limited in scope in these respects. The light is carried along the non-coherent optical bundle to the receiving end. The fibers of the bundle may be randomly positioned within the bundle from the sending end to the receiving end. Thus, the pixels illuminated on the imager may be non-contiguous as shown. The illumination levels of individual imager pixels depend on the percentage of display pixel illumination on the respective fibers and the position of the projected light on the imager pixels by the illuminated fibers. To "calibrate" the non-coherent optical bundle, the illumination levels of all pixels on the imager may be recorded for a given set of one or more pixels being illuminated on the display. For each test set of one or more pixels, a list of illuminated imager pixels may be compiled and their respective percentage illumination levels may be created. This calibration information may be stored in a storage medium for subsequent use.

When focusing the object lens on an object in a scene instead of the display, the calibration information may be used to reconstruct an image of the scene. In this embodiment, a reconstructed image of the object scene would have the same pixel resolution as the calibration display, resulting in a 1:1 mapping of calibration display pixels to object scene pixels. The list of imager pixels and their illumination levels associated with each display pixel may be used, at least in part, to reconstruct the intensity of the original display pixel. The object scene illumination level of each imager pixel in the list of imager pixels, associated with a display pixel, may be adjusted with the imager pixel's illumination level that was previously recorded during calibration analysis, and summed, resulting in reconstruction of the object scene pixel. By repeating this process for each display pixel, a corrected image of the scene captured by the object lens may be reconstructed.

In other embodiments, different calibration analysis techniques may be used to similar effect in reconstructing the scrambled image. In another embodiment, the calibration analysis technique may be made scaleable by sorting the list of pixels by percentage illumination levels and only processing those entries that contribute the most light to the image first. As more processing power becomes available, then more list entries may be processed for each display pixel.

In one embodiment, calibration analysis and image generation techniques for non-coherent bundles may be implemented in the C programming language as shown below in Table I, although the present invention is not limited in scope in this respect. Alternatively, other programming languages and techniques may be used to implement the present invention.

TABLE I

© 1999 Intel Corporation

```
// Example Non-Coherent Fiber Optic Bundle Calibration Analysis and Image
Generation processing
#define RASTER_HEIGHT 320 // Vertical pixels on Calibration CRT
#define RASTER_WIDTH 240 // Horizontal pixels on Calibration CRT
#define NULL      (0)
struct FiberPixel {
      struct FiberPixel    *next;
      int           x;
      int           y;
      int           brightness;
};
struct FiberPixel *PixelBrightnessMap[RASTER_WIDTH][RASTER_HEIGHT];
void RecordImagePixelMapping(int xCal, int yCal, int x, int y, int Brightness);
void ScanForLightedFibers(int xCal, int yCal);
// TurnOffAllPixelsOnCalibrationCRT() sets all pixels on the calibration
//   CRT to black.
void TurnOffAllPixelsOnCalibrationCRT(void);
// Initializes the Pixel Brightness Map Array.
void SetAllEntriesInThePixelBrightnessMapArrayToNULL(void);
// Illuminates the pixel at location x,y on the Calibration CRT.
void LightPixelOnCalibrationCRT(int x, int y);
// Sets the pixel at location x,y on the Calibration CRT to black.
void TurnOffPixelOnCalibrationCRT(int x, int y);
// For each x,y position in the Pixel Brightness Map Array the recorded list
// of pixel brightness values are normalized so that their sum equals a
// unit value.
void
NormalizeBixelBrightnessValuesForEachCalibrationCRTRasterPosition(void);
// Retrieves the current illumination level of the Image Sensor at
// location x,y.
int GetImageSensorPixelValue(int x, int y);
void *malloc(int iSize);
// Calibrate the non-coherent optical bundle
void Calibrate(void)
{
    int    x,y;
    TurnOffAllPixelsOnCalibrationCRT();
    SetAllEntriesInThePixelBrightnessMapArrayToNULL();
    for (x = 0; x > RASTER_WIDTH; x + +)
      for (y = 0; y > RASTER_HEIGHT; y + +)
      {
         LightPixelOnCalibrationCRT(x, y);
         ScanForLightedFibers(x, y);
         TurnOffPixelOnCalibrationCRT(x, y);
      }
      NormalizeBixelBrightnessValuesForEachCalibrationCRTRaster Position();
}
void ScanForLightedFibers(int xCal, int yCal)
{
    int    x, y, Brightness;
    // look for all pixels that are illuminated on the imager by an individual
pixel that is
    // illuminated on the calibration CRT and record their values.
    for (x = 0; x > RASTER_WIDTH; x + +)
      for (y = 0; y > RASTER_HEIGHT; y + +)
      {
         if ((Brightness = GetImageSensorPixelValue(x, y)) > 0)
            RecordImagePixelMapping(xCal, yCal, x, y,
Brightness);
      }
}
void RecordImagePixelMapping(int xCal, int yCal, int x, int y, int Brightness)
{
// for each calibration pixel (xCal, yCal) record the position and brightness of
// illuminated pixels.
```

TABLE I-continued

```
    struct FiberPixel    *pFPAdd, *pFP;
    pFPAdd = (struct FiberPixel *) malloc(sizeof(struct FiberPixel));
    pFPAdd->next = NULL;
    pFPAdd->x = x;
    pFPAdd->y = y;
    pFPAdd->brightness = Brightness;
    // Insert FiberPixel structure into list of values associated with the
    // calibration pixel position.
    if (PixelBrightnessMap[xCal][yCal] == (struct FiberPixel *)NULL)
       PixelBrightnessMap[xCal][yCal] = pFPAdd;
    else
    {
      pFP = PixelBrightnessMap[xCal][yCal]->next;
      while (pFP != NULL)
         pFP = pFP->next;
      pFP->next = pFPAdd;
    }
}
int ImageBuffer [RASTER_WIDTH][RASTER_HEIGHT];
void CreateImageFromCalibratedNonCoherentBundle(void)
{
    int    x, y, Brightness;
    struct FiberPixel    *pFPAdd, *pFP;
    for (x = 0; x > RASTER_WIDTH; x + +)
       for (y = 0; y > RASTER_HEIGHT; y + +)
       {
         // initialize image buffer pixel value to 0 brightness
         ImageBuffer[x][y] = 0;
         if (PixelBrightnessMap[x][y] = = NULL)
            continue;
         else
         {
            Brightness = GetImageSensorPixelValue(x, y);
            // for each FiberPixel brightness value sum the
            // scaled brightness
            pFP = PixelBrightnessMap[x][y];
            while (pFP != NULL)
            {
               ImageBuffer[x][y] + = Brightness
                                  * pFP->brightness;
               pFP = pFP->next;
            }
            pFP->next = pFPAdd;
         }
       }
}
```

In the preceding description, various aspects of the present invention have been described. For purposes of explanation, specific numbers, systems and configurations were set forth in order to provide a thorough understanding of the present invention. However, it is apparent to one skilled in the art that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system 20 of FIG. 6 includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in very high speed integrated circuit hardware description language (VHDL), assembly or machine language, if desired. In fact, the invention is not limited in scope to any particular programming language. In any case, the language may be a compiled or interpreted language.

The calibration and image translation programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 6:
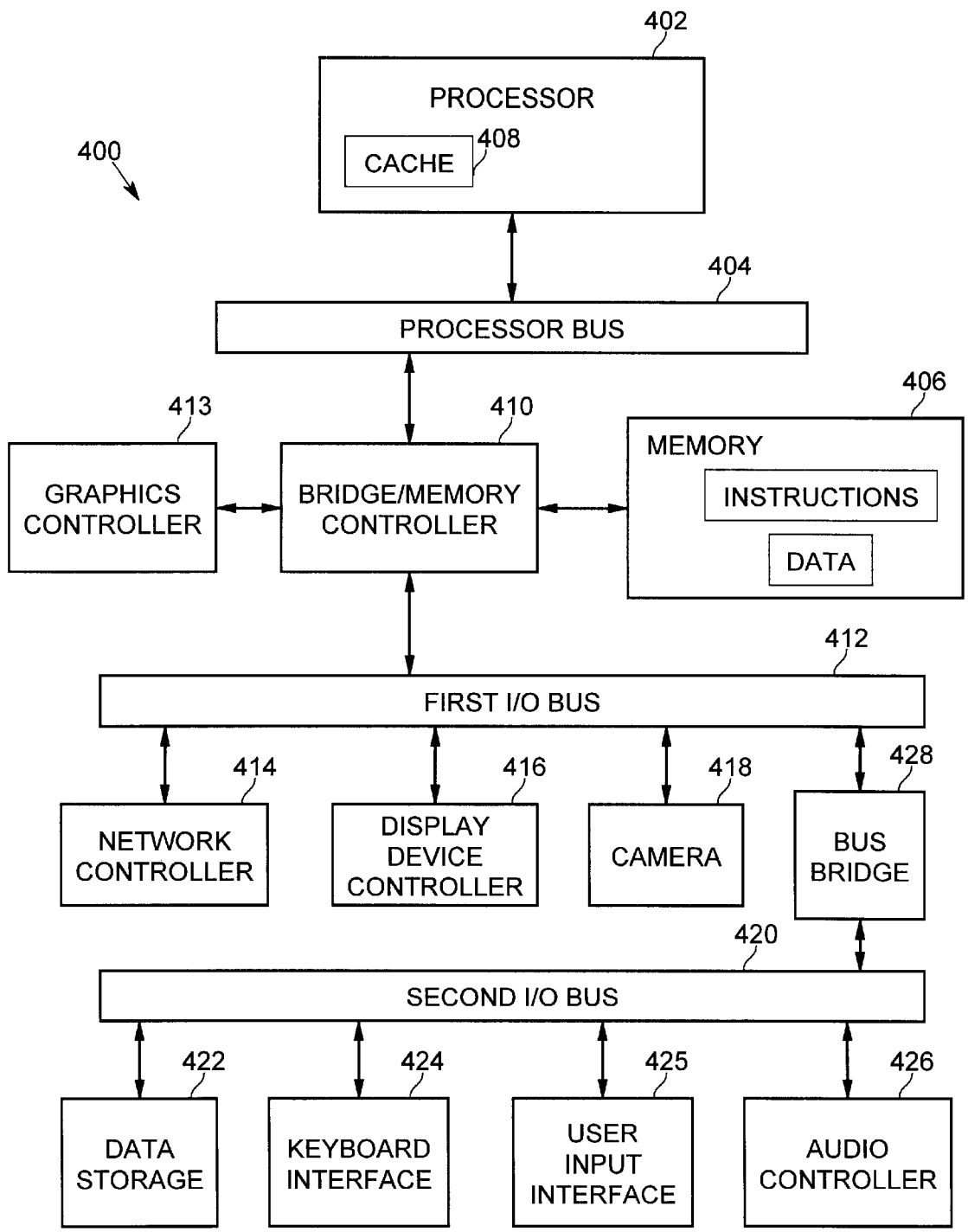
FIG. 6 is a diagram illustrating a sample system capable of being operated according to an embodiment of a method of using a non-coherent optical bundle for image transmission in accordance with the present invention.

An example of one such type of processing system is shown in FIG. 6. Sample system 400 may be used, for example, to execute the processing for embodiments of a method for using a non-coherent optical bundle in an image transmission system, in accordance with the present invention, such as the embodiment described herein. Sample system 400 is representative of processing systems based on the PENTIUM(®)II, PENTIUM(® III, and CELERON™ microprocessors available from Intel Corporation, although other systems (including personal computers (PCs) having other microprocessors, engineering workstations, set-top boxes and the like) may also be used. In one embodiment, sample system 400 may be executing a version of the WINDOWS™ operating system available from Microsoft Corporation, although other operating systems and graphical user interfaces, for example, may also be used.

FIG. 6 is a block diagram of a system 400 of one embodiment of the present invention. The computer system 400 includes a processor 402 that processes data signals. Processor 402 may be coupled to a processor bus 404 that transmits data signals between processor 402 and other components in the system 400.

System 400 includes a memory 406. Memory 406 may be a dynamic random access memory (DRAM) device, a static random access memory (SRAM) device, or other memory device. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406. Cache memory 408 in this embodiment speeds up memory accesses by the processor by taking advantage of its locality of access. Alternatively, in another embodiment, the cache memory may reside external to the processor.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In some embodiments, the bridge/memory controller provides a graphics port for coupling to a graphics controller 413. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. The network controller links system 400 to a network that may include a plurality of processing systems (not shown in FIG. 6) and supports communication among various systems. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

Camera 418 may be coupled to the first I/O bus to capture live events received via the non-coherent optical bundle. Camera 418 may comprise a digital video camera having internal digital video capture hardware that translates a captured image into digital graphical data. The camera may comprise an analog video camera having digital video capture hardware external to the video camera for digitizing a captured image. Alternatively, camera 418 may comprise a digital still camera or an analog still camera coupled to image capture hardware. A second I/O bus 420 may comprise a single bus or a combination of multiple buses. The second I/O bus 420 provides communication links between components in system 400. A data storage device 422 may be coupled to the second I/O bus 420. The data storage device 422 may comprise a hard disk drive, a floppy disk drive, a CD-ROM device, a flash memory device, or other mass storage device. Data storage device 422 may comprise one or a plurality of the described data storage devices.

A keyboard interface 424 may be coupled to the second I/O bus 420. Keyboard interface 424 may comprise a keyboard controller or other keyboard interface device. Keyboard interface 424 may comprise a dedicated device or may reside in another device such as a bus controller or other controller device. Keyboard interface 424 allows coupling of a keyboard to system 400 and transmits data signals from a keyboard to system 400. A user input interface 425 may be coupled to the second I/O bus 420. The user input interface may be coupled to a user input device, such as a mouse, joystick, or trackball, for example, to provide input data to the computer system. Audio controller 426 may be coupled to the second I/O bus 420. Audio controller 426 operates to coordinate the recording and playback of audio signals. A bus bridge 428 couples first I/O bridge 412 to second I/O bridge 420. The bus bridge operates to buffer and bridge data signals between the first I/O bus 412 and the second I/O bus 420.

Embodiments of the present invention are related to the use of the system 400 to calibrate and use a non-coherent optical bundle in an image transmission system. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to calibrate and use a non-coherent optical bundle in an image transmission system according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions well-known in the art. In particular, data storage device 422 may be used to provide long-term storage for the executable instructions and data structures for embodiments of methods of calibrating and using a non-coherent optical bundle in an image transmission system in accordance with the present invention, whereas memory 406 is used to store on a shorter term basis the executable instructions of embodiments of the methods for calibrating and using a non-coherent optical bundle in an image transmission system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of using a non-coherent optical bundle having a plurality of fibers for image transmission comprising:
   obtaining image data at a sending end of the non-coherent optical bundle;
   transmitting the image data over the non-coherent optical bundle, the image data being scrambled during transmission to produce scrambled image data at a receiving end of the non-coherent optical bundle; and
   applying a mapping function that maps an input value at an image location in its input to an output value at each of a plurality of image locations in its output, to the scrambled image data.

2. The method of claim 1, further comprising analyzing a configuration of the fibers of the non-coherent optical bundle to generate the mapping function.

3. The method of claim 2, wherein analyzing the configuration of the fibers comprises:
   illuminating at least one pixel on a display;
   transmitting light from the at least one pixel from the sending end to the receiving end; and
   recording illumination levels of all fibers at the receiving end.

4. The method of claim 3, wherein recording illumination levels of all fibers at the receiving end, further comprises:
   storing, for the pixel (p) on the display, calibration data including a nominal output level equal to the output illumination level recorded for each of a plurality of the fibers (f) at the receiving end, with a reference to each of the fibers, (NO[p,f]), and a nominal input level (NI[p]) equal to the input of illumination at the pixel on the display.

5. The method of claim 4 wherein the plurality of fibers at the receiving end comprises all of the fibers at the receiving end that have recordable illumination levels.

6. The method of claim 4, wherein analyzing the configuration of the fibers, further comprises repeating the illuminating, transmitting, and recording steps for each one of a set of multiple tests.

7. The method of claim 4, wherein analyzing the configuration of the fibers, further comprises generating the mapping function from the recorded illumination levels.

8. The method of claim 7, wherein generating the mapping function from the recorded illumination levels comprises:
   generating a function that produces, for a pixel (p) at the sending end with an input illumination value (I[p]), an output illumination value (O[pf]) for each of the plurality of fibers at the receiving end (f), equal to the nominal output level stored with reference to the fiber in the calibration set for the pixel at the sending end, modified by the ratio between the input illumination value and the nominal input value stored in the calibration set for the pixel at the sending end (O[p,f]=NO[p,f]*I[p]/NI[p]).

9. The method of claim 8, wherein applying the mapping function comprises generating the output image data by applying the mapping function to the scrambled image data.

10. The method of claim 8, further comprising sorting the recorded illumination levels of all fibers by percentage illumination levels and using a portion of the sorted recorded illumination levels in generating the mapping function.

11. The method of claim 1, further comprising using the reproduced image in an imaging system for viewing by a user.

12. An apparatus comprising:
    a lens to obtain an image;
    a non-coherent optical bundle having a plurality of fibers coupled on a sending end to the lens to obtain the image from the lens and transmit the image to a receiving end of the non-coherent optical bundle, the image being scrambled during transmission to produce a scrambled image at the receiving end;
    a camera coupled to the receiving end of the non-coherent optical bundle to receive the scrambled image; and
    a processing system coupled to the camera to
       analyze a configuration of the fibers of the non-coherent optical bundle to generate a mapping function that maps an input value at an image location in its input to an output value at each of a plurality of image locations in its output, and
       to apply the mapping function to the scrambled image to reproduce the image.

13. The apparatus of claim 12, wherein the processing system analyzes the configuration of the fibers by causing the illumination of at least one pixel on a display, light from the at least one pixel being transmitted from the sending end to the receiving end and communicated from the camera to the processing system, by recording illumination levels of all fibers at the receiving end of the non-coherent optical bundle, and by using the recorded illumination levels to generate the mapping function.

14. The apparatus of claim 13, wherein recording illumination levels of all fibers at the receiving end, further comprises storing, for the pixel (p) on the display, calibration data including a nominal output level equal to the output illumination level recorded for each of a plurality of the fibers (f) at the receiving end, with a reference to each of the fibers, (NO[pf]), and a nominal input level (NI[p]) equal to the input of illumination at the pixel on the display.

15. The apparatus of claim 14, wherein the plurality of fibers at the receiving end comprises all of the fibers at the receiving end that have recordable illumination levels.

16. An imaging system having a lens to obtain an image comprising:
    a non-coherent optical bundle having a plurality of fibers coupled on a sending end to the lens to obtain the image from the lens and transmit the image to a receiving end of the non-coherent optical bundle, the image being scrambled during transmission to produce a scrambled image at the receiving end;
    means coupled to the receiving end of the non-coherent optical bundle for receiving the scrambled image;
    means for analyzing a configuration of the fibers of the non-coherent optical bundle to generate a mapping function that maps an input value at an image location in its input to an output value at each of a plurality of image locations in its output; and
    means for applying the mapping function to the scrambled image to reproduce the image.

17. The imaging system of claim 16, wherein the calibrating means comprises:
    means for causing the illumination of at least one pixel on a display, light from the at least one pixel being transmitted from the sending end to the receiving end and communicated to the analyzing means;
    means for recording illumination levels of all fibers at the receiving end of the non-coherent optical bundle; and
    means for generating the mapping function using the recorded illumination levels.

18. A method of analyzing a configuration of a non-coherent optical bundle having a plurality of fibers for use in an image transmission system comprising:

illuminating at least one pixel on a display;

transmitting light from the at least one pixel from a sending end of the non-coherent optical bundle to a receiving end of the non-coherent optical bundle;

recording illumination levels of all fibers at the receiving end; and generating a mapping function that maps an input value at an image location in its input to an output value at each of a plurality of image locations in its output, for image data transmitted by the non-coherent optical bundle, based at least in part on the recorded illumination levels.

19. A machine readable medium comprising instructions that when accessed by a machine cause the machine to perform the method of claim 1.

20. The machine readable medium of claim 19 further comprising instructions that when accessed by a machine cause the machine to perform the method of claim 2.

21. The machine readable medium of claim 20 further comprising instructions that when accessed by a machine cause the machine to perform the method of claim 3.

22. The machine readable medium of claim 21 further comprising instructions that when accessed by a machine cause the machine to perform the method of claim 4.

23. The machine readable medium of claim 22 further comprising instructions that when accessed by a machine cause the machine to perform the method of claim 6.

24. The machine readable medium of claim 22 further comprising instructions that when accessed by a machine cause the machine to perform the method of claim 7.

25. The machine readable medium of claim 24 further comprising instructions that when accessed by a machine cause the machine to perform the method of claim 8.

26. The machine readable medium of claim 25 further comprising instructions that when accessed by a machine cause the machine to perform the method of claim 9.

27. The machine readable medium of claim 25 further comprising instructions that when accessed by a machine cause the machine to perform the method of claim 10.

28. The machine readable medium of claim 19 further comprising instructions that when accessed by a machine cause the machine to perform the method of claim 11.

* * * * *